United States Patent [19]

Esterowitz et al.

[11] Patent Number: 5,381,433
[45] Date of Patent: Jan. 10, 1995

[54] 1.94 μM LASER APPARATUS, SYSTEM AND METHOD USING A THULIUM-DOPED YTTRIUM-LITHIUM-FLUORIDE LASER CRYSTAL PUMPED WITH A DIODE LASER

[75] Inventors: Leon Esterowitz, Springfield; Robert C. Stoneman, Alexandria, both of Va.

[73] Assignee: The United States of America as represented by the Secretary of the Navy, Washington, D.C.

[21] Appl. No.: 10,253

[22] Filed: Jan. 28, 1993

[51] Int. Cl.$^6$ ............................................. H01S 3/16
[52] U.S. Cl. ..................................... 372/41; 372/69
[58] Field of Search .................. 372/41, 71, 66, 19, 372/34, 27

[56] References Cited

U.S. PATENT DOCUMENTS

| | | | |
|---|---|---|---|
| 4,069,154 | 11/1990 | Esterowitz et al. | 372/41 |
| 4,797,893 | 1/1989 | Dixon | 372/41 |
| 4,949,348 | 8/1990 | Nguyen et al. | 372/41 |
| 4,965,803 | 10/1990 | Esterowitz et al. | 372/41 |
| 4,967,416 | 10/1990 | Esterowitz et al. | 372/41 |
| 4,969,150 | 11/1990 | Esterowitz et al. | 372/41 |
| 4,974,230 | 11/1990 | Hemmati | 372/41 |
| 5,038,353 | 8/1991 | Esterowitz et al. | 372/41 |
| 5,172,391 | 12/1992 | Zayhowski | 372/27 |

OTHER PUBLICATIONS

Stoneman et al., Tunable CW Solid State Laser Action in the 2μm Region, SPIE, vol. 1223 Solid State Lasers, 1990, pp. 231–236.
Esterowitz et al., Trivalent Thulium Laser at 1.95 μm for Enhanced Laser-Tissue Interactions, SPIE, vol. 1202, Laser-Tissue Interaction, Jan. (1990), 4 pages.

Primary Examiner—Léon Scott, Jr.
Attorney, Agent, or Firm—Thomas E. McDonnell; George Jameson

[57] ABSTRACT

A laser apparatus, system and method include a laser crystal formed of thulium-doped yttrium-lithium-fluoride, and a laser diode arranged in proximity to the laser crystal. The laser diode is capable of emitting a first laser light which is suitable for use as a pump beam for causing lasing to occur in the laser crystal. In response to the first laser light from the laser diode, the laser crystal emits a second laser light at a wavelength which is relatively highly-absorbed by organic tissue and/or water. The second laser light is therefore well-suited to medical applications, for example, and can be used to irradiate organic tissue for medical treatment.

22 Claims, 3 Drawing Sheets

1.94 μM LASER APPARATUS, SYSTEM AND METHOD USING A THULIUM-DOPED YTTRIUM-LITHIUM-FLUORIDE LASER CRYSTAL PUMPED WITH A DIODE LASER

BACKGROUND OF THE INVENTION

1. Field of the Invention

The present invention relates to a laser apparatus, system and method using a laser crystal pumped with a diode laser, or more particularly, to a laser apparatus, system and method using a thulium-doped yttrium-lithium-fluoride (YLF) laser crystal pumped with a diode laser.

2. Description of the Related Art

Recently, interest has increased concerning the development of lasers capable of generating laser light in a wavelength range from one to ten micrometers. Such lasers are expected to be increasingly used in medical or communication applications, for example. The usefulness of such lasers for medical applications is demonstrated below with reference to FIG. 1.

For many prospective medical applications, lasers will be required to generate laser light at a wavelength which is highly absorbed by organic tissue to reduce or eliminate damage to organic tissue during medical treatment using such lasers. In FIG. 1, a graph of the absorption coefficient of organic tissue as a function of radiation wavelength indicates several peak absorption coefficients (such as that labelled A) in the range of wavelengths from one to ten micrometers. By using a laser light having a wavelength at or near a peak absorption coefficient of organic tissue, it is expected that extraneous damage to organic tissue will be reduced or avoided in medical applications.

While many conventional lasers have been developed which generate laser light having wavelengths from one to ten micrometers, such conventional lasers generally suffer from one or more disadvantages which limit their use for many applications. For example, many of such conventional lasers require tuning techniques and associated tuning elements, to adjust the laser light output therefrom to an appropriate wavelength. Such tuning techniques and associated elements generally increase the size, expense and/or complication of these conventional lasers, and/or require a relatively high degree of skill to operate. Also, many of such conventional lasers require a relatively large amount of power to operate, and/or have performances which are undesirably dependent upon temperature.

SUMMARY OF THE INVENTION

An object of the present invention is to provide an apparatus, system and method capable of generating laser light having a wavelength which is relatively highly-absorbed by organic tissue and/or water.

Another object of the present invention is to provide an apparatus, system and method capable of generating laser light having a wavelength which is relatively highly-absorbed by organic tissue and/or water without requiring relatively expensive, sizeable and/or cumbersome equipment.

Another object of the present invention is to provide an apparatus, system and method capable of generating laser light having a wavelength which is relatively highly-absorbed by organic tissue and/or water which does not require a relatively high degree of skill to operate.

Another object of the present invention is to provide an apparatus, system and method capable of generating laser light having a wavelength which is relatively highly-absorbed by organic tissue and/or water which does not require a relatively large amount of power to operate.

Another object of the present invention is to provide an apparatus, system and method capable of generating laser light having a wavelength which is relatively highly-absorbed by organic tissue and/or water, and which has a performance which is relatively temperature-independent.

Another object of the present invention is to provide an apparatus, system and method capable of generating laser light which is relatively highly-absorbed by organic tissue and/or water, and which has a relatively high power and/or intensity.

A further object of the present invention is to provide an apparatus, system and method using a laser crystal formed of thulium-doped yttrium-lithium-fluoride (YLF), which is pumped by a laser diode.

These and other objects of the present invention are obtained by the apparatus, system and method herein disclosed. According to the present invention, there is provided an apparatus including a laser crystal formed of thulium-doped yttrium-lithium-fluoride (YLF), and a laser diode arranged in proximity to the laser crystal. The laser diode is capable of emitting a first laser light which is suitable for use as a pump beam for causing lasing to occur in the laser crystal. Based on the first laser light from the laser diode, the laser crystal emits a second laser light at a wavelength which is relatively highly-absorbed by organic tissue and/or water. The second laser light is therefore well-suited to medical applications, for example, and can be used to irradiate organic tissue for medical treatment.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENTS

Figure 2:
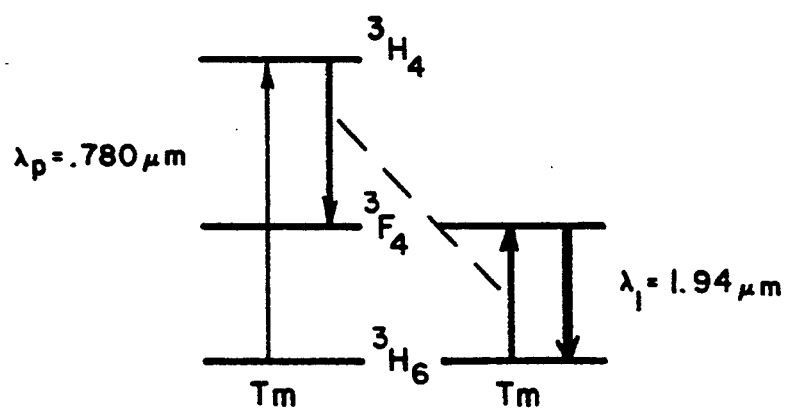
FIG. 2 is a diagram of relevant transitions for lasing at approximately 1.94 micrometers in a thulium-doped yttrium-lithium-fluoride (YLF) laser crystal in accordance with the present invention.

FIG. 2 is a diagram of relevant transitions for lasing at approximately 1.94 micrometers in a thulium-doped yttrium-lithium-fluoride (YLF) laser crystal in accordance with the present invention. A first laser light, or pump beam, having a wavelength $\lambda_p$ is provided to thulium activator ions in the laser crystal, to induce electrons to transit from the $^3H_6$ energy level to the $^3H_4$ energy level, or to higher energy levels existing in the thulium-doped YLF laser crystal. Most preferably, the first laser light has a wavelength $\lambda_p$ of approximately 780 nanometers (nm), although wavelengths of approximately 790 and 792 nanometers are also preferred for reasons which will be explained in a later section.

Through a phenomenon known as "cross-relaxation" illustrated by a broken line in FIG. 2, an electron which transits from the $^3H_4$ energy level or other nearby energy levels to the $^3F_4$ energy level release enough energy to cause another electron to transit from the $^3H_6$ energy level to the $^3F_4$ energy level. The cross-relaxation phenomenon therefore allows for a highly efficient use of the energy provided by the first laser light since for every electron which transits from the $^3H_6$ energy level or other nearby energy level to the $^3H_4$ energy level, two electrons eventually reside in the $^3F_4$ energy level.

Figure 1:
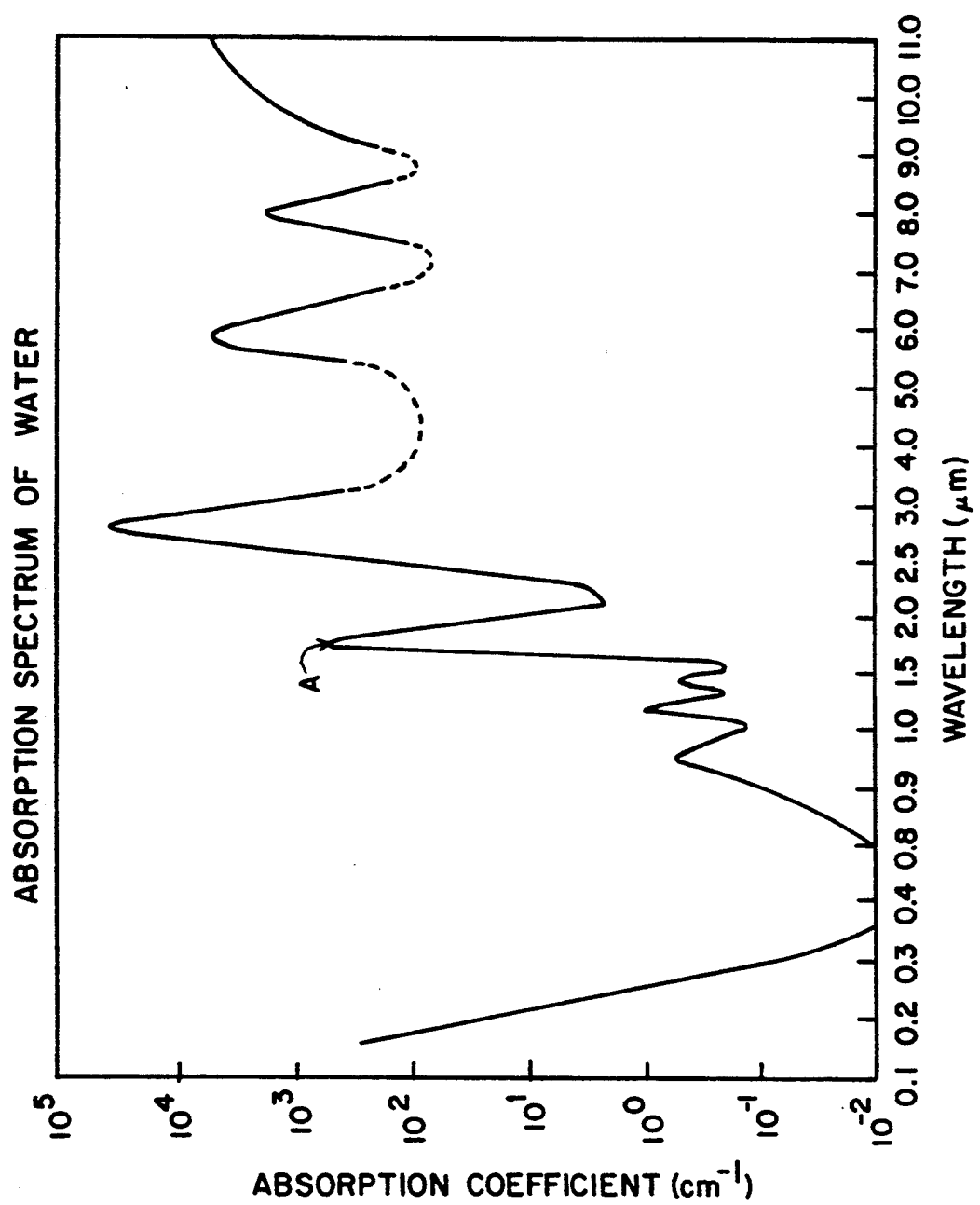
FIG. 1 is a graph of a radiation absorption spectrum of organic tissue.

The laser transition occurs from the $^3F_4$ energy level to the $^3H_6$ energy level and results in a second laser light having a wavelength $\lambda_l$ of about 1.94 micrometers. Referring back to FIG. 1, it will be noted that the wavelength $\lambda_l$ corresponds closely to the peak absorption coefficient of organic tissue A at about 1.94 micrometers. Accordingly, the second laser light is highly-absorbed by organic tissue and/or water, and therefore, is suitable for irradiating organic tissue for medical applications, for example.

In order to generate the second laser light with sufficient power for a given application and/or to achieve efficient use of the energy provided by the first laser light generated by the laser diode, for example, conditions for providing the first laser light to the thulium-doped YLF laser crystal can be controlled to facilitate satisfaction of the above objectives. These conditions are addressed below with reference to FIG. 3.

Figure 3:
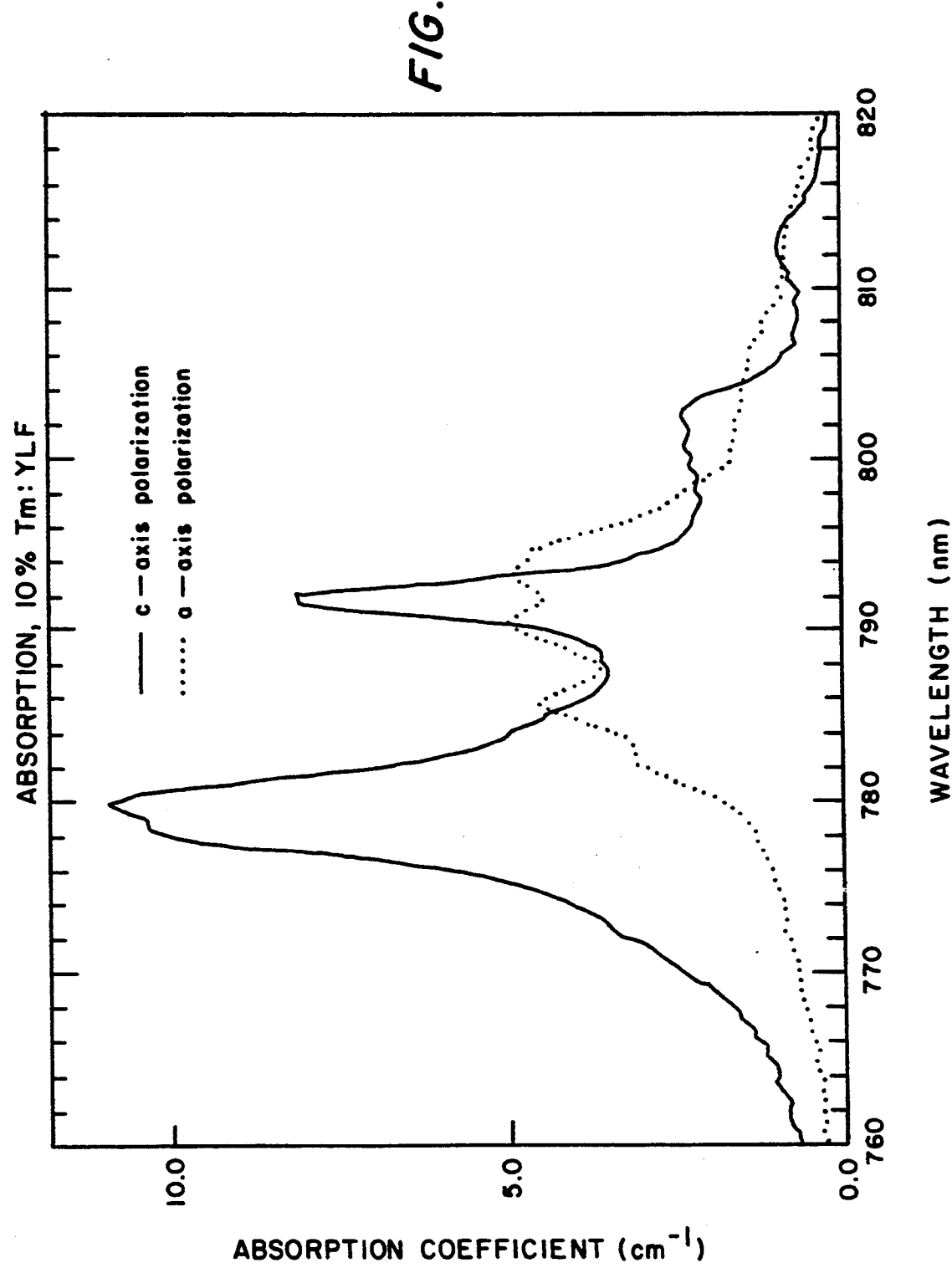
FIG. 3 is a graph of the radiation absorption spectrum of a 10% thulium-doped YLF laser crystal in accordance with the present invention.

FIG. 3 is a graph of the absorption coefficient for a 10% thulium-doped YLF laser crystal as a function of radiation wavelength. The solid line indicates the absorption spectrum of the first laser light in the 10% thulium-doped YLF laser crystal when the first laser light is polarized along the "c" axis of the thulium-doped YLF crystal, and the broken line indicates the absorption spectrum of the first laser light in the 10% thulium-doped YLF laser crystal when the first laser light is polarized along the "a" axis of the thulium-doped YLF crystal.

In FIG. 3, the maximum peak absorption coefficient of the thulium-doped YLF laser crystal is obtained when the first laser light is polarized along the c-axis and has a wavelength $\lambda_p$ of approximately 780 nanometers. Accordingly, to obtain relatively efficient use of the energy provided by the first laser light, it is most preferred to pump the thulium-doped YLF laser crystal using a first laser light which has a polarization along the c-axis of the thulium-doped YLF laser crystal, and which has a wavelength $\lambda_p$ of approximately 780 nanometers.

Also, because the maximum peak absorption coefficient of the thulium-doped YLF laser crystal has a relatively broad line width of approximately 8 nanometers, thermal drift of the wavelengths of the first laser light generated by a laser diode (FIG. 4) can occur to some degree while maintaining relatively high absorption of the first laser light. Therefore, pumping of the thulium-doped YLF laser crystal using a first laser light with a wavelength $\lambda_p$ of approximately 780 nanometers and a polarization along the c-axis, is preferred for this reason as well.

However, in some applications, attempting to pump the thulium-doped YLF laser crystal with a first laser light polarized along the c-axis and having a wavelength $\lambda_p$ of approximately 780 nanometers, can lead to undesirable results. For example, if a particular laser diode generates first laser light which has a power spectrum significantly exceeding the linewidth (approximately 8 nanometers) of the maximum peak absorption coefficient at a wavelength $\lambda_p$ of approximately 780 nanometers, other polarizations or wavelengths could actually lead to increased efficiency of use of the energy provided by the first laser light. Also, for example, some laser diodes are affected by changes in temperature which could cause the power spectrum to shift out of the highly absorbed region centered at approximately 780 nanometers, thus resulting in diminished efficiency of use of the energy provided by the first laser light.

Accordingly, the first laser light can be generated at other wavelengths or polarizations to achieve advantageous results. For example, in FIG. 3, another peak absorption coefficient occurs at a wavelength of approximately 792 nanometers at a line width of approximately 3 nanometers and having a polarization along the c-axis. Also, a relatively broad peak absorption coefficient occurs approximately centered about a wavelength of approximately 790 nanometers, having a line width of approximately 16 nanometers and polarized along the a-axis, although this peak absorption coefficient is approximately half that of the maximum peak absorption coefficient. In any case, for some applications, it is also preferred to pump the thulium-doped YLF crystal with a first laser light having a wavelength of approximately 792 nanometers and a polarization along the c-axis, or a first laser light having a wavelength of approximately 790 nanometers and polarized along the a-axis.

Absorption of the first laser light generated by a diode laser as well as the power of the second light generated in the thulium-doped YLF crystal are enhanced to some degree by increasing the amount of thulium in the YLF laser crystal. However, there are lower and upper limits to the amount of thulium which can be used in the YLF laser crystal before loss mechanisms begin to limit performance of the thulium-doped YLF laser crystal. A broad range of thulium in the YLF laser crystal is from about 2.5% to about 20%, and a preferred range of thulium in the YLF laser crystal is from about 4% to about 8%.

Figure 4:
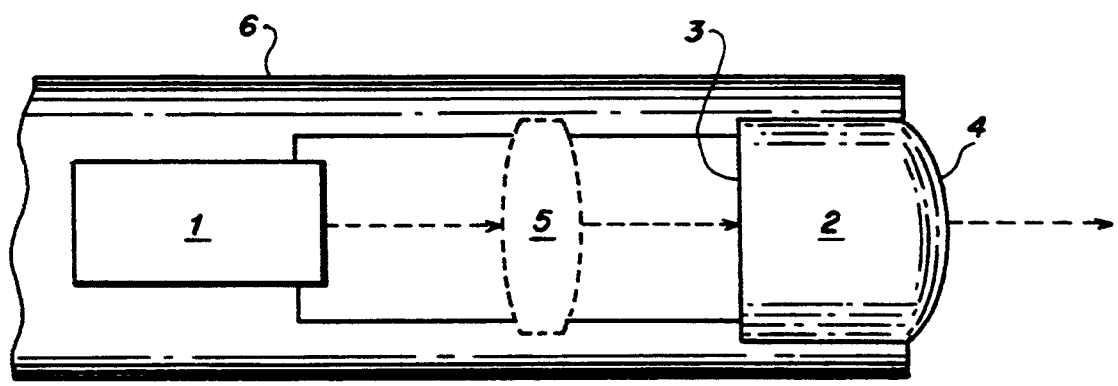
FIG. 4 is a diagram of an apparatus and system using a thulium-doped YLF laser crystal and a laser diode in accordance with the present invention.

In FIG. 4, a laser diode 1 is coupled to receive power from an external source (not shown). The laser diode 1 is preferably manufactured to emit first laser light which is polarized and which has a wavelength of approximately 780, 790 or 792 nanometers. Such laser diodes are commercially available from Spectra-Diode Laboratories, Inc. of California.

As indicated above, the thulium-doped YLF laser crystal 2 can be formed from a melt which includes from about 2.5% to about 20% of thulium. The thulium-doped YLF laser crystal 2 has a first face 3 and a second face 4. The first face 3 has a dichroic coating which is transmissive to wavelengths at or near the wavelength of the first laser light, but which is reflective to wavelengths at or near the wavelength of the second laser light generated by the thulium-doped YLF laser crystal 2. The second face 4 has a coating which is partially transmissive to wavelengths at or near the wavelength of the second laser light generated in the thulium-doped YLF laser crystal 2. Accordingly, the first face 3 and the second face 4 define a laser cavity in the thulium-doped YLF laser crystal 2 for generating the second laser light which has a wavelength at or near 1.94 micrometers. Although the first face 3 can be a flat surface, the second face 4 can be formed with a curvature so that the second laser light is focused at a desired point to the right of the second side 4 in FIG. 4. The thulium-doped YLF laser crystal 2 can be manufactured by Litton/Airtron, Inc. or Lightning Optical, Inc.

Also, an optical element 5 can be arranged between the laser diode 1 and the thulium-doped YLF laser crystal 2 to modify (i.e., to focus or to polarize, for example) the first laser light emitted from the laser diode 1. However, the optical element 5 has a broken line in FIG. 4 because the optical element 5 is an optional element of the present invention, and can be omitted if a desired application does not require its use.

The present invention has been successfully tested at room-temperature using a 10% thulium-doped YLF laser crystal 2 with a length (i.e., the distance between the first face 3 and the second face 4) of 2 millimeters. The first face 3 was a flat surface (i.e., having a radius of curvature at ∞) and the second face 4 had a radius of curvature of 10 millimeters. The first face 3 had a dichroic coating with a transmissivity of about 96% at a wavelength of 790 nanometers, and a reflectivity of about 100% at about 1.94 micrometers. The second face 4 had a reflectivity of about 99.5% at 1.94 micrometers. The laser diode 1 generated the first laser light at about 790 nanometers, and was placed at a distance of about 5 centimeters from the first face 3. Spaced midway between the laser diode 1 and the 10% thulium-doped YLF laser crystal 2, the optical element 5 included a focal lens for focusing the first laser light from the laser diode 1 onto the 10% thulium-doped YLF laser crystal 2. The 10% thulium-doped YLF laser crystal 2 exhibited lasing at about 1.94 micrometers.

A housing 6 can be provided to fix a positional relationship between the laser diode 1, the thulium-doped YLF laser crystal 2 and/or the optical element 5. The housing 6 can also serve to protect the laser diode 1, the thulium-doped YLF laser crystal 2 and/or the optical element 5.

In operation, the laser, diode 1 is excited by an external source (not shown) such as a power supply, for example, and induced to emit the first laser light. The first laser light is emitted from the laser diode 1 and transmitted through the dichroic coating of the first face 3 of the thulium-doped YLF laser crystal 2. The first laser light propagates in the thulium-doped YLF laser crystal 2, and causes the generation of the second laser light in the laser cavity defined by the first face 3 and the second face 4. The second laser light which has a wavelength at or near 1.94 micrometers, is emitted from the second face 4 of the thulium-doped YLF laser crystal 2. The second laser light can be used to irradiate organic tissue, for example, for medical applications.

It should be noted that the second laser light generated by the thulium-doped YLF laser crystal 2 is highly polarized. This characteristic of the thulium-doped YLF laser crystal 2 is advantageous for applications such as Q-switching or modulation which required polarized input light. Therefore, the second laser light can be used directly for such applications as Q-switching or modulation without requiring the addition of a polarizing element.

Also, the highly-polarized second laser light generated by the thulium-doped YLF laser crystal 2, provides other advantages such as resistance to the effects of "thermal birefringence". Thermal birefringence is caused by different heat distributions in a host material resulting in laser light which has a polarization depending on the heat distribution. Thermal birefringence problems are more acute in pulsed operation of the thulium-doped YLF laser crystal 2 as opposed to continuous wave (cw) operation, because the heat distribution in the thulium-doped YLF laser crystal 2 changes more frequently in pulsed operation. However, because the second laser light generated by the thulium-doped YLF laser crystal 2 is highly polarized, the problems associated with thermal birefringence are reduced in the present invention even in pulsed operation.

The many features and advantages of the present invention are apparent from the detailed specification and thus it is intended by the appended claims to cover all such features and advantages of the invention which follow in the true spirit and scope thereof. Further, since numerous modifications and changes will readily occur to those skilled in the art, it is not desired to limit the invention to the exact construction and operation illustrated and described, and accordingly all suitable modifications and equivalence may be resorted to as falling within the scope of the invention.

What is claimed and desired to be secured by Letters Patent of the United States is:

1. An apparatus comprising:
   a laser diode for emitting a first laser light at a preselected wavelength; and
   a laser cavity containing a laser crystal formed of thulium-doped yttrium-lithium-fluoride containing thulium activator ions, said laser crystal being responsive to the first laser light from said laser diode for emitting a second laser light on the $^3F_4$ to $^3H_6$ transition of the thulium activator ions and at a wavelength of approximately 1.94 micrometers.

2. The apparatus of claim 1 wherein:
   said laser diode emits the first laser light at a wavelength of approximately 780 nanometers.

3. The apparatus of claim 1 wherein:
   said laser diode emits the first laser light at a wavelength of approximately 792 nanometers.

4. The apparatus of claim 1 wherein:
   said laser diode emits the first laser light at a wavelength of approximately 790 nanometers.

5. The apparatus of claim 1 wherein:
   said laser crystal includes an amount of thulium ranging from approximately 2.5% to approximately 20%.

6. The apparatus of claim 1 wherein:
   said laser crystal includes a preferred amount of thulium ranging from approximately 4% to approximately 8%.

7. An apparatus comprising:
   a laser crystal formed of thulium-doped yttrium-lithium-fluoride containing thulium activator ions; and
   a laser diode disposed in proximity to said laser crystal for emitting a first laser light to said laser crystal to cause said laser crystal to emit a second laser light at a wavelength of approximately 1.94 micrometers on the $^3F_4$ to $^3H_6$ transition of the thulium activator ions, said laser diode emitting the first laser light with a polarization parallel to a c-axis of said laser crystal to maximize absorption of the first laser light in said laser crystal.

8. An apparatus comprising:
a laser crystal formed of thulium-doped yttrium-lithium-fluoride containing thulium activator ions; and
a laser diode disposed in proximity to said laser crystal for emitting a first laser light to said laser crystal to cause said laser crystal to emit a second laser light at a wavelength of approximately 1.94 micrometers on the $^3F_4$ to $^3H_6$ transition of the thulium activator ions, said laser diode emitting the first laser light with a polarization parallel to an a-axis of said laser crystal when the first laser light is at a wavelength of approximately 790 nanometers.

9. An apparatus comprising:
a laser crystal formed of thulium-doped yttrium-lithium-fluoride; and
a laser diode disposed in proximity to said laser crystal for emitting a first laser light to said laser crystal to cause said laser crystal to emit a second laser light, at a wavelength of approximately 1.94 micrometers on the $^3F_4-^3H_6$ transition of the thulium activator ions said second laser light being polarized.

10. An apparatus comprising:
a laser crystal formed of thulium-doped yttrium-lithium-fluoride; and
a laser diode disposed in proximity to said laser crystal for emitting a first laser light to said laser crystal to cause said laser crystal to emit a second laser light, at a wavelength of approximately 1.94 micrometers on the $^3F_4-^3H_6$ transition of the thulium activator ions said second laser light from said laser crystal being generated by cross-relaxation.

11. A system comprising:
a laser crystal formed of thulium-doped yttrium-lithium-fluoride containing thulium activator ions;
a laser diode disposed in proximity to said laser crystal for emitting a first laser light to said laser crystal to cause said laser crystal to emit a second laser light at a wavelength of approximately 1.94 micrometers on the $^3F_4$ to $^3H_6$ transition of the thulium activator ions; and
an optical element, disposed between said laser diode and said laser crystal.

12. The system of claim 11 further including:
a housing for holding said laser diode, said optical element and said laser crystal therein.

13. The system of claim 11 wherein:
said optical element polarizes the first laser light.

14. The system of claim 11 wherein:
said optical element focuses the first laser light.

15. A method comprising the steps of:
a) forming a laser crystal of thulium-doped yttrium-lithium-fluoride containing thulium activator ions;
b) exciting a laser diode to emit a first laser light to the laser crystal; and
c) generating a second laser light, at a wavelength of approximately 1.94 micrometers on the $^3F_4$ to $^3H_6$ transition of the thulium activator ions, from the laser crystal in response to the emission of the first laser light.

16. The method of claim 15 wherein said exciting step includes the step of:
causing the laser diode to emit the first laser light at a wavelength of approximately 780 nanometers.

17. The method of claim 15 wherein said exciting step includes the step of:
causing the laser diode to emit the first laser light at a wavelength of approximately 792 nanometers.

18. The method of claim 15 wherein said forming step includes the step of:
including in the laser crystal an amount of thulium ranging from approximately 2.5% to approximately 20%.

19. The method of claim 15 wherein said forming step includes the step of:
including in the laser crystal an amount of thulium ranging from approximately 4% to approximately 8%.

20. The method of claim 15 further including the step of:
polarizing the first laser light to have a polarization corresponding to a c-axis of the laser crystal.

21. A method comprising the steps of:
a) generating a first laser light from a laser diode; and
b) causing a laser crystal of thulium-doped yttrium-lithium-fluoride containing thulium activator ions to emit a second laser light on the $^3F_4$ to $^3H_6$ transition of the thulium activator ions using the first laser light generated by the laser diode.

22. The method of claim 21 further including the step of:
c) irradiating organic tissue using a second laser light of a wavelength of approximately 1.94 micrometers generated based on said step (b).

* * * * *